US012195131B1

(12) United States Patent
Carrig

(10) Patent No.: US 12,195,131 B1
(45) Date of Patent: Jan. 14, 2025

(54) CYCLE-MOUNTABLE CARGO RETENTION APPARATUS

(71) Applicant: Widefoot LLC, Fort Collins, CO (US)

(72) Inventor: Hunter Christian Carrig, Fort Collins, CO (US)

(73) Assignee: Widefoot LLC, Fort Collins, CO (US)

(*) Notice: Subject to any disclaimer, the term of this patent is extended or adjusted under 35 U.S.C. 154(b) by 0 days.

(21) Appl. No.: 18/762,433

(22) Filed: Jul. 2, 2024

(51) Int. Cl.
B62J 11/04 (2020.01)
B62J 7/02 (2006.01)
B62J 7/08 (2006.01)

(52) U.S. Cl.
CPC .. *B62J 7/02* (2013.01); *B62J 7/08* (2013.01)

(58) Field of Classification Search
CPC ..... B62J 11/04; B62J 11/00; B62J 7/02; B62J 7/08; Y10T 24/3444
See application file for complete search history.

(56) References Cited

U.S. PATENT DOCUMENTS

| 5,040,709 A * | 8/1991 | Neugent | B62J 11/04 224/431 |
| 9,643,676 B2 * | 5/2017 | Shih | B62J 11/04 |
| 2023/0117805 A1 * | 4/2023 | Broadbent | B62J 11/00 224/414 |

FOREIGN PATENT DOCUMENTS

EP 3708474 A1 * 9/2020 ............ B62J 11/04

OTHER PUBLICATIONS

Author Not Indicated; "Morse Cargo Cage"; <https://wolftoothcomponents.com/products/morse-cargo-cage>; (visited Jun. 20, 2024; publication date not indicated; US).
Author Not Indicated; "Cargo Mount"; <https://widefoot.com/product/cargomount/>; (visited Jun. 20, 2024; publication date not indicated; US).
Author Not Indicated; "CC2 Lite"; <https://widecage.com/product/cc2lite/>; (visited Jun. 20, 2024; publication date not indicated; US).
Author Not Indicated; "Cargo Cage"; <https://tailfin.cc/product/cargo-cage-system/cargo-cages/cargo-cage/?v=7516fd43adaa>; (visited Jun. 20, 2024; publication date not indicated; US).
Author Not Indicated; "Shapeshifting Usability"; <https://tailfin.cc/product/cargo-cage-system/cargo-cages/cargo-cage/?v=7516fd43adaa>; (visited Jun. 20, 2024; publication date not indicated; US).
Author Not Indicated; "State Bicycle Co.—Desert Cargo Cage"; <https://statebicycle.com/products/state-bicycle-co-desert-cargo-cage>; (visited Jun. 20, 2024; publication date not indicated; US).
Author Not Indicated; "Gear-EXP Series-Anything Cage"; <https://salsacycles.com/gear/exp_series_anything_cage_hd>; (visited Jun. 20, 2024; publication date not indicated; US).

(Continued)

*Primary Examiner* — Corey N Skurdal
(74) *Attorney, Agent, or Firm* — Wiedmann Law LLC

(57) ABSTRACT

Various embodiments of the inventive cycle-mountable cargo retention apparatus may feature: a cargo cradle having a cradle longitudinal axis, a spine that defines a spine plane, and cargo support fastener holes established at respective non-zero cargo support fastener hole distances from the spine plane; and a cargo support that is removably fastenable to the cargo cradle with fasteners, where such fasteners, when the cargo support is fastened to the cargo cradle, define fastener centerlines that lie in an installed cargo support fastener plane that is perpendicular to the cradle longitudinal axis.

20 Claims, 6 Drawing Sheets

(56) References Cited

OTHER PUBLICATIONS

Author Not Indicated; "Fixplus cargo cage luggage carrier"; <https://bike-discount.de/en/fixplus-cargo-cage-luggage-carrier>; (visited Jun. 20, 2024; publication date not indicated; US).

Author Not Indicated; "Fixplus Cargo Frame Rack"; <https://tradeinn.com/bikeinn/en/fixplus-cargo-frame-rack/139939658/p>; (visited Jun. 20, 2024; publication date not indicated; US).

Author Not Indicated; "Mounting Options"; <https://blackburndesign.com/p/outpost-cargo-bike-cage/350130000100000010.html>; (visited Jun. 20, 2024; publication date not indicated; US).

Author Not Indicated; "Cargo Cage"; <https://apidura.com/shop/cargo-cage/>; (visited Jun. 20, 2024; publication date not indicated; US).

* cited by examiner

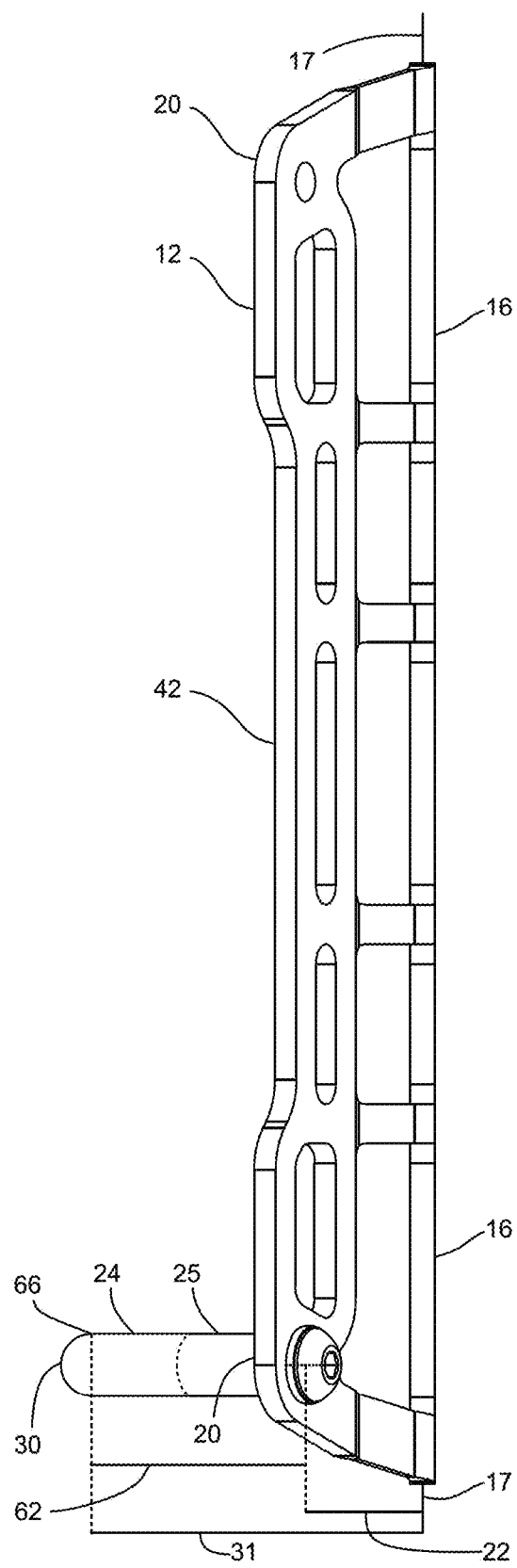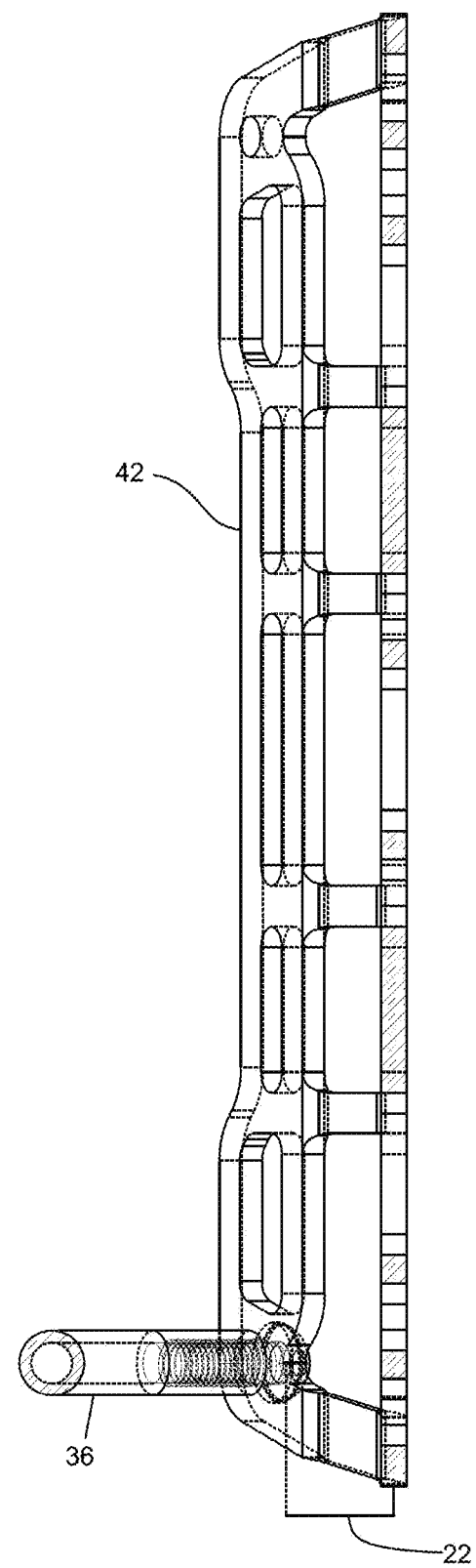
FIG. 4A
FIG. 4B

CYCLE-MOUNTABLE CARGO RETENTION APPARATUS

BACKGROUND OF THE INVENTIVE TECHNOLOGY

A cycle-mountable cargo retention apparatus 11, referred to less formally as a cargo cage by many in the industry, may mount on cycle component 15 such as a bicycle frame using the same mounting bolts and locations one would use to affix a bottle cage (water bottle holder). Cargo 41 (e.g., tent sack, water bottle, etc.) can then be strapped to the apparatus 11. Cargo cages have been in circulation for decades, but currently available products may still benefit from improvements that, e.g., enhance apparatus strength, improve material utilization and/or improve ease-of-use.

Certain prior art cycle-mountable cargo retention apparatus are made from a single sheet of aluminum and may include: a cargo cradle (used to cradle the cargo 41 in a storage position relative to the cycle, as well as provide strap guides to facilitate strap use) including a spine (used to bolt the apparatus to the bicycle) and outer, longitudinal cradle portions, and a lower cargo support such as a platform (typically serving to bear at least a portion of the weight of the cargo while it is strapped to the cradle, including during riding). While there may be prior art cycle-mountable cargo retention apparatus that feature a removable cargo support, such apparatus may feature removable fastening to an apparatus spine—and the comparatively large cargo-weight induced torque to that spine that results from such fastening location—and thus may be particularly vulnerable to torque-based fatigue, damage, wear and/or limitations on use. Embodiments of the inventive technology disclosed herein may seek to reduce cargo weight-induced torque and its resultant impact on apparatus performance, durability and/or service life.

BRIEF SUMMARY OF THE INVENTIVE TECHNOLOGY

Embodiments of the inventive technology may be described as a cycle-mountable cargo retention apparatus with a cargo cradle having a cradle longitudinal axis, a spine that defines a spine plane, and cargo support fastener holes established at respective non-zero cargo support fastener hole distances from the spine plane. The apparatus may feature a cargo support that is removably fastenable to the cargo cradle with fasteners, where such fasteners, when the cargo support is fastened to the cargo cradle, define fastener centerlines that lie in an installed cargo support fastener plane that is perpendicular to the cradle longitudinal axis. Embodiments may offer advantages relative to: improved apparatus strength, particularly improved resistance to cargo-weight induced bending of apparatus components due to torque acting around cargo support to cargo cradle fastening sites, improved strength to weight ratios, and ease of removal of and/or installation of the cargo support from/to the cargo cradle. Of course, other advantages may exist, some or all of which may be disclosed or alluded to elsewhere in this application.

BRIEF DESCRIPTION OF THE DRAWINGS

Drawings show an embodiment of the inventive technology, and may show apparatus and its components in different scale. Note that, for clarity of presentation reasons, it is not the case that every single instance of a numbered element is called out in the figures.

FIG. 4A shows a right side view of a lower portion of the apparatus of FIG. 1A. FIG. 4B shows FIG. 4A in transparent manner.

DESCRIPTION OF EMBODIMENTS OF THE INVENTIVE TECHNOLOGY

The present inventive technology may manifest in several embodiments and may exhibit different inventive facets. The description provided herein, while sufficiently enabling, may only explicitly describe certain of the several embodiments. Elements of the invention described herein can potentially be combined in various ways to create additional embodiments not explicitly described herein. Embodiments described herein may be exemplary only; they should not be read to limit the scope of the invention. Additionally, it should be understood that this application describes not only the multi-element apparatus and methods explicitly described, but also those involving any of the possible various combinations and permutations of such elements, and indeed perhaps even one element alone.

Figure 6:
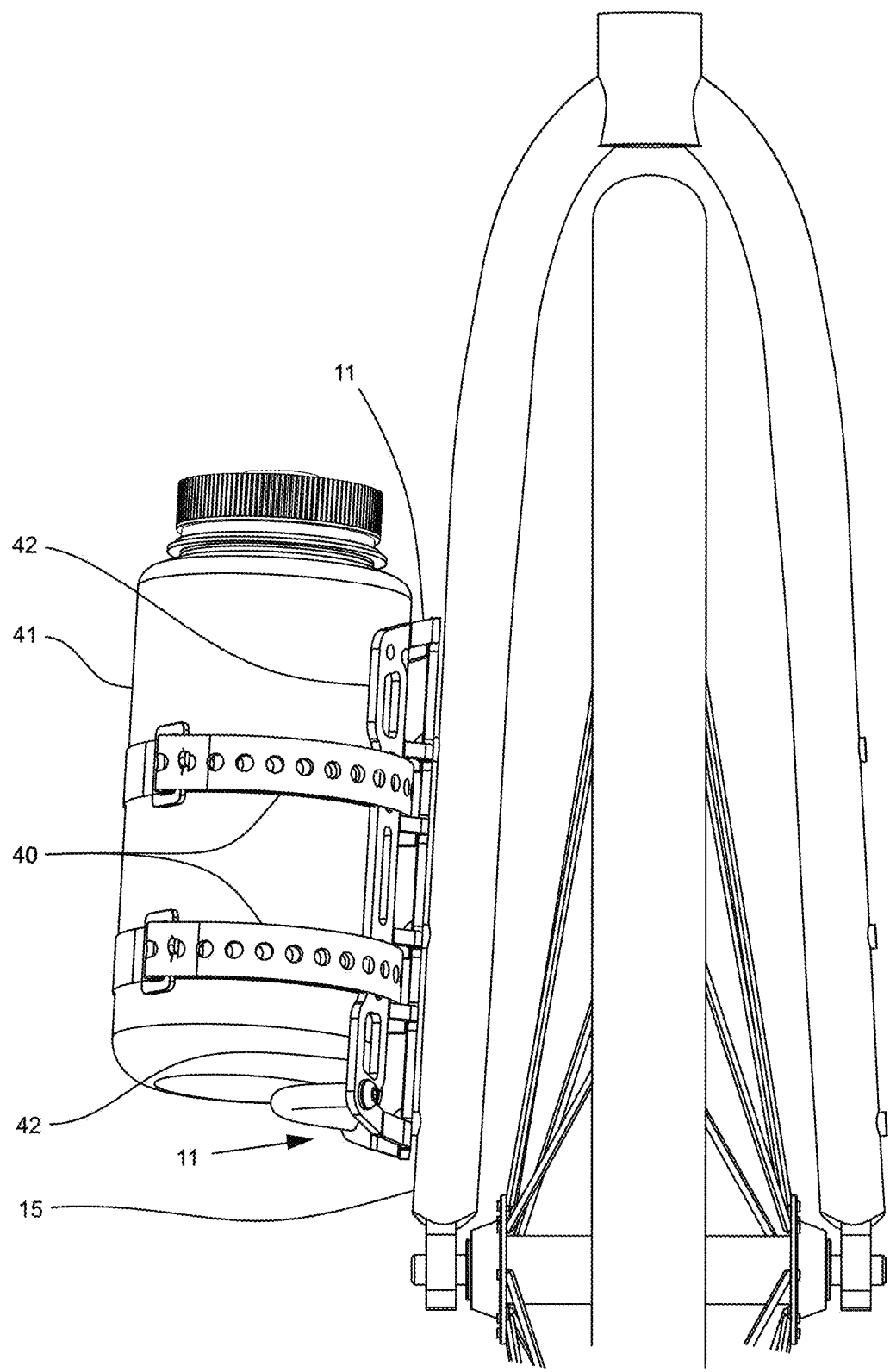
FIG. 6 shows a right side, perspective view of the apparatus of FIG. 1A as mounted on a cycle component (in this figure, a bicycle front fork).

A cycle-mountable cargo retention apparatus 11, in its various embodiments, may include a cargo cradle 12 defining a cradle longitudinal axis 13, the cargo cradle 12 itself having cargo cradle mounting holes 14 that enable mounting of the apparatus 11 on a cycle component 15 (e.g., front fork of bicycle as shown in FIG. 6, frame tube of bicycle, bicycle rack, storage bin of motorcycle, scooter component, as but a few of many examples). While mounting is indeed performed with fasteners (e.g., threaded fasteners such as bolts, as but one example), the apparatus is said to be mounted on the cycle component because of conventional use of the term mounted in the industry to refer to the securement of the entire apparatus on the cycle component.

Figure 2A:
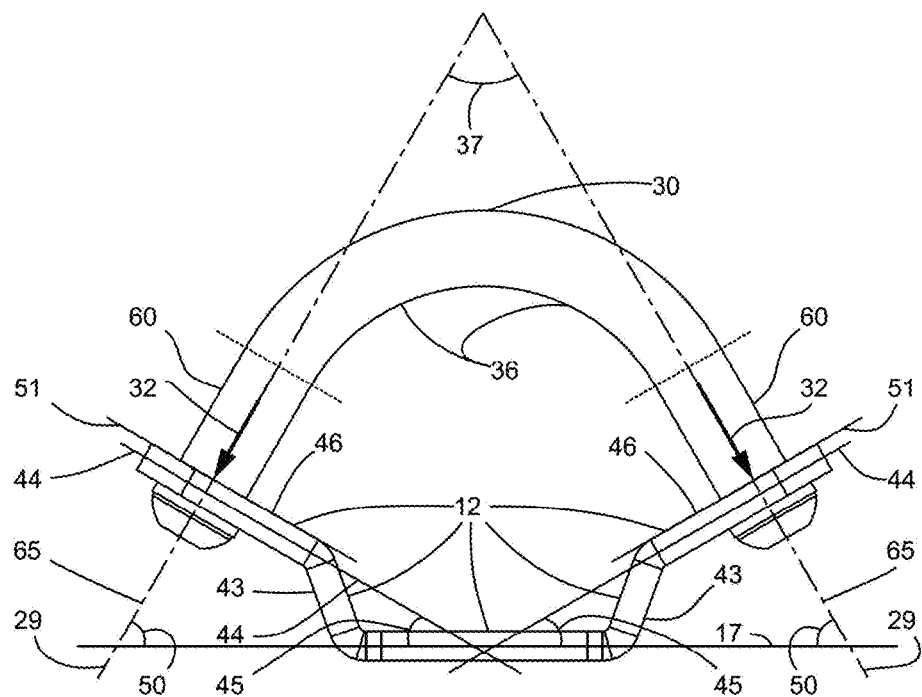
FIG. 2A shows a perspective view of the apparatus of FIG. 1A.

A cradle spine 16, a cradle part/portion(s), may be directly fastened (e.g., with bolts) to the cycle component 15 on which the apparatus 11 may be mounted. A cradle longitudinal axis 13 may run along the length of (and beyond) the cargo cradle 12 and may, while passing through cradle material (in cross-section), occupy a position/location (in cross-section) that's in the center of the cradle. In certain embodiments (e.g., as shown in FIG. 2A), the axis may pass through the spine's cross-sectional centroid (instead of, e.g., passing through the centroid of a shape the cargo cradle 12 defines in cross-section). The spine 16 can be continuous or non-continuous along its length (indeed, even where there are complete gaps (perhaps for weight savings) in the cradle component that is directly mounted on the cycle component, the cradle is still considered to include a spine 16, albeit a discontinuous one). Even where the only cradle components that are directly mounted on a cycle component 15 are at the two cradle end portions 20 (i.e., where there is a large single gap between such directly fastened components), the cradle is still considered as having a spine 16 (that would be made up of such directly fastened components). The spine 16, discontinuous or not, may define a spine plane 17, which is a plane in which the spine 16 may be fairly characterized as lying (e.g., where such plane includes the cradle longitudinal axis 13 and is parallel with a lower and/or upper surface of the spine 16). For example, where the spine 16 is plate metal, the spine plane 17 may include points that are halfway through the thickness of the plate (in other less uniform and/or non-flat spines, the spine plane may be said to include points at the four corners of the spine 16, where such points are halfway through the thickness of the spine 16 at such corners). When the cradle is viewed in cross-section and the spine is fairly characterized as situated in a central part of that cradle, it may be a central cradle spine (see, e.g., FIG. 2B). Note that particular embodiments may feature a spine that is, e.g., established on a side of the cradle longitudinal axis. Further, even where the apparatus is mounted to a cycle component via fasteners through mounting holes that are other than those in, e.g., a central spine, the apparatus is still said to have such spine if there are mounting holes in that spine that allow it to be directly mounted to the cycle component (in an alternate, perhaps primary, mounting set-up).

The cargo cradle 12 may have outer, longitudinal cradle portions 18, each on a different side of the cradle spine 16. The outer, longitudinal cradle portions 18, together with the central cargo spine 16, may be configured so that the cargo cradle 12 exhibits a concave shape in a cross-section that is perpendicular to the cradle longitudinal axis 13 (the cargo support 24 forms no part of such shape). Such concave shape, which would be formed by the surface of the cradle closest to cargo when cargo is situated in it—with the "open" feature of the shape facing away from the cycle component on which the apparatus is mounted (when the apparatus is mounted)—may be any of an almost infinite number of shapes, including but not limited to, e.g., gull wing (including, e.g., with wings tipped up as shown in FIG. 2A, or not, where wings may or may not present a flat cargo-facing wing surface), semi-circular, "V"-shaped, perhaps "frusto-V" (truncated V-shape, where the lower point of the "V" is removed/"sliced off" and may appear as the cradle spine 16), open topped box, and curved. The shape may even have a portion, e.g., a spine, that opens towards the bicycle component (when apparatus is mounted), where the other components (e.g., outer longitudinal cradle portions) open away from that component, leaving a predominantly concave shape to the cradle. The concave shape may assist in secure retention of cargo 41 placed in and strapped to the cradle. In particular embodiments, the cargo cradle 12 may be a single piece of material (e.g., plate metal), fabricated (e.g., bent and punched) to achieve shape, weight saving, and/or functionality goals. Longitudinal portions need not be, but certainly may be, substantially identical in shape (e.g., they may be, but need not be, mirror images of one another).

The cargo cradle 12 may also feature two cargo cradle end portions 20, where, e.g., each such end portion may be the terminal 15% of the respective end of the cradle. Embodiments may present cargo support fastener holes 21 (holes through which any of a variety of fasteners may be passed) established on at least one of the cargo cradle end portions 20, and each of the holes (on a single cradle end portion 20) on a different outer, longitudinal cradle portion 18, at a respective cargo support fastener hole distance 22 from the spine plane 17 (where each such hole has associated therewith its own such distance, where such distances may be equal in value or different). One of such holes may be a left hole on a left outer, longitudinal cradle portion at a left, cargo support fastener hole distance from the spine plane 17; the other may be a right hole on a right outer, longitudinal cradle portion at a right, cargo support fastener hole distance from the spine plane 17 (where right and left refer to a particular side of the cradle longitudinal axis, with apparatus viewed with the cargo support at the bottom and towards the viewer). As discussed more below, each of the cargo support fastener hole distances 22 may be non-zero. Of note with respect to distances disclosed herein, is that where a referenced component does not present a single point/location from which to measure, a distance from that component is measured from a most representative point/site of that component, e.g., a midpoint/midplane of that component. Also, the term hole as used herein does not necessarily imply a circular hole, as indeed term hole includes an elongated slot, among spaces exhibiting other shapes.

The cargo cradle 12 may feature strap guides 19 (e.g., slots, open spaces between structural components) that may enable compressive, strap-type retention (e.g., with straps 40 such as or including belt with buckle, webbing with tightening fittings such as buckles or clips, Velcro®, clasp, hasp, cord, etc.) of the cargo in and to the cargo cradle 12.

The cargo cradle 12 may be any of a variety of materials, including but not limited to plate metal fabrication; such material may, in particular embodiments, have a different cross-sectional shape than does the cargo support 24 (e.g., in certain embodiments, the shape of the cradle material (in cross-section perpendicular to its longitudinal axis) may be rectangular with larger width as compared with height, perhaps with gaps therein, and the shape of the cargo support 24 (in cross-section perpendicular to its characteristic centerline (which may be straight and/or curved) may be, e.g., circular, oval, hexagonal, etc.)

In particular embodiments, the cargo support (e.g., cargo support 24, whether it be a lower cargo support or an upper cargo support, or able to serve as both) may provide support for cargo that is supplemental to that provided by, e.g., the cradle and straps that are through the cradle and secured around the cargo, to retain cargo during cycle riding in secured position on the apparatus. The cargo support 24 itself may feature one or more of the following: two cargo support end portions 25, each with a straight, internally threaded hole 26 therein; support end portions 25, which may be straight (perhaps resulting in straight, internally threaded cargo support end portions 60); it may be at least partially curved shape, e.g., curved between straight end portions; it may be elongated bar (even where curved along its length, and of a variety of cross-sections); it may be tubular; when fastened to the cargo cradle 12, it may traverse from one side (e.g., the outermost portion of one outer, longitudinal cradle portion 18) of the cargo cradle 12 to the other; its shape in cross-section may, as but a few examples, be circular, oval, square, rectangular, pentagonal, hexagonal, octagonal, or at least partially curved; it may be tubular in part or whole; it may be partially solid (i.e., along part of its length); it may be fabricated from other than plate metal (from which, in particulate embodiments, the cargo cradle 12 may be fabricated); it may be thicker in cross-section (at its thickest point, e.g., diameter) than is the cargo cradle 12 at its thickest (e.g., plate thickness); it may be a low profile cargo support (such that the cargo support 24 does not unacceptably jut out and benefit from apparatus or cargo support removal when not supporting cargo). Of course, as with other features disclosed herein, any of such features are not necessarily required. Where cargo support end portions are straight, such portions are each said to extend, in total length, from a terminal end thereof to where such "straightness" ends, e.g. to where a curve in the cargo support initiates. When cargo support end portions are not straight, such portions are each said to extend 15% of the entire length (along the at least partially curved centerline) of the cargo support from each terminus.

Note that the term cargo support, shown in the figures as cargo support 24, can be either a lower or upper cargo support (as an upper cargo support, the mounted apparatus would present the cargo support substantially at the top, with cargo somehow attached to and hanging from that upper cargo support); FIG. 6 shows an apparatus with a lower cargo support, mounted on a cycle component. Where an apparatus features a cargo support that can function as either a lower or an upper cargo support, then such apparatus, of course, is fairly characterized as including a lower (or upper) cargo support. Any element (e.g., component, distance, etc.) disclosed herein and whose descriptive name/label includes the more general term "cargo support" (without explicitly specified as upper or lower) should be understood as encompassing either type of cargo support. For example, the cargo support fastener holes may be lower (or upper) cargo support fastener holes, the cargo support fastener hole distance(s) may be lower cargo support fastener hole distance(s); the installed cargo support fastener plane may be an installed lower cargo support fastener plane; the cargo support apex may be a lower cargo support apex; the cargo support apex distance may be a lower cargo support apex distance; the cargo support end portions (straight or otherwise) may be lower cargo support end portions; and the cargo support bend may be a lower cargo support bend.

FIGS. 4A and 4B in particular may call out certain referenced distances and show their relative positions/sizes as may appear in the portrayed (and other) embodiment(s) of the inventive technology. In particular embodiments, the cargo support fastener hole distances 22 are equal. Such may facilitate manufacture, improve functionality and/or lend an aesthetic symmetry to the apparatus 11, but is not a necessary feature of the inventive technology. In particular embodiments, cargo support fastener holes 21 may be established on at least one of the cargo cradle end portions 20, and on the outer, longitudinal cradle portions 18; such holes 21 may be established at respective cargo support fastener hole distances 22 from the spine plane 17 (where each such hole has associated therewith its own such distance, where such distances may be equal in value or different), and such distances may be non-zero. Such may—when compared with those designs where the cargo support is fastened to the cargo cradle at the cradle spine (as where an extension of the spine, via a 90° bend, forms the cargo support), and thus where a cargo support fastening distance from the spine plane is zero—provide cargo support strength benefits and/or improved apparatus longevity. This is because such non-zero distance effectively reduces the difference between: (a) the cargo support apex distance 31, which is the distance from the spine plane 17 to the cargo-contacting surface 66 (where cargo has a flat lower surface against the cargo support) of the general site of the cargo support that is furthest from that spine plane 17 (i.e., the cargo support apex 30), where surface 66 may be at its midplane 61, on the side away from the spine plane (see, e.g., 30 of FIG. 2A); and (b) each of the cargo support fastener hole distances 22 from the spine plane 17 (such difference between (a) and (b) shown as distance 62). The cargo contacting surface 66 (of the cargo support apex 30) may be, e.g., a point, a linear surface (a line), an areal surface (surface having an area).

Such reduction in distance 62 effectively means that such cargo contacting surface 66 (of apex 30) is closer to a cargo support fastener hole axis 63, which is the axis that includes centers of the two cargo support fastener holes 21 (at the termina 38 of the cargo support end portions 25) when the cargo support 24 is fastened to the cargo cradle. In various embodiments, such closer distance 62 may be no more than 90%, 80%, 70%, 60%, 50%, 40%, or 30% of the cargo support apex distance 31 to the spine plane 17, where ranges associated with lower percentages achieving greater strength benefits.

Articulated in alternative manner, the two cargo support fastener holes 21 may be characterized as being established above the spine plane 17 (i.e., in a direction away from the spine plane 17), such that each of the two cargo support fastener hole distances 22 may be at least 10%, at least 15%, at least 20%, at least 25%, at least 30%, at least 40%, at least 50%, from and including 20% to 100%, 25% to 90%, or 30% to 85% of the cargo support apex distance 31.

Ranges associated with higher percentages may reduce the moment arm by which the cargo weight as applied to the cargo support 24 may effect a moment or torque substantially about the cargo support fastener hole axis 63, thereby reducing the cargo weight-induced torque acting on the material forming the cargo support fastener holes 21, on cargo support end portions 25, and/or on the fasteners through them. Certain embodiments may be described as including a single component cargo support 24 that is fastened at its two ends to raised longitudinal sides of a cargo cradle.

In particular embodiments, the improvement in strength of the fastening of the cargo support 24 to the cradle 12, relative to prior art designs, may be achieved, at least in part, by the establishment of a straight, internally threaded hole 26 in and along a length of (perhaps along the entire length of, or merely a portion of the total length thereof) each cargo support end portion 25 (which, in particular embodiments, are straight).

In particular embodiments, the apparatus 11, excluding fasteners and straps 40, may be viewed as having only two physically discrete components: the cargo cradle 12 and the cargo support 24 (where the cargo support may be referred to as a discrete cargo support, because it may be a different part from the cradle (even where the cargo cradle is (removably) fastened thereto), as opposed to, e.g., a continuous extension of the same flat material used for the cradle). Such may result in a robust, easy-to-use apparatus. In certain embodiments, the use of only two fasteners (each at a different site) to fasten the cargo support 24 to the cargo cradle 12 may also help to achieve ease-of-use benefits. That the cargo support 24 may be fastenable to and removable from the cargo cradle 12 may provide additional utility benefits to the user, such as retention of large cargo whose retention/support with the apparatus would not be possible if the cargo support 24 were used.

Figure 2B:
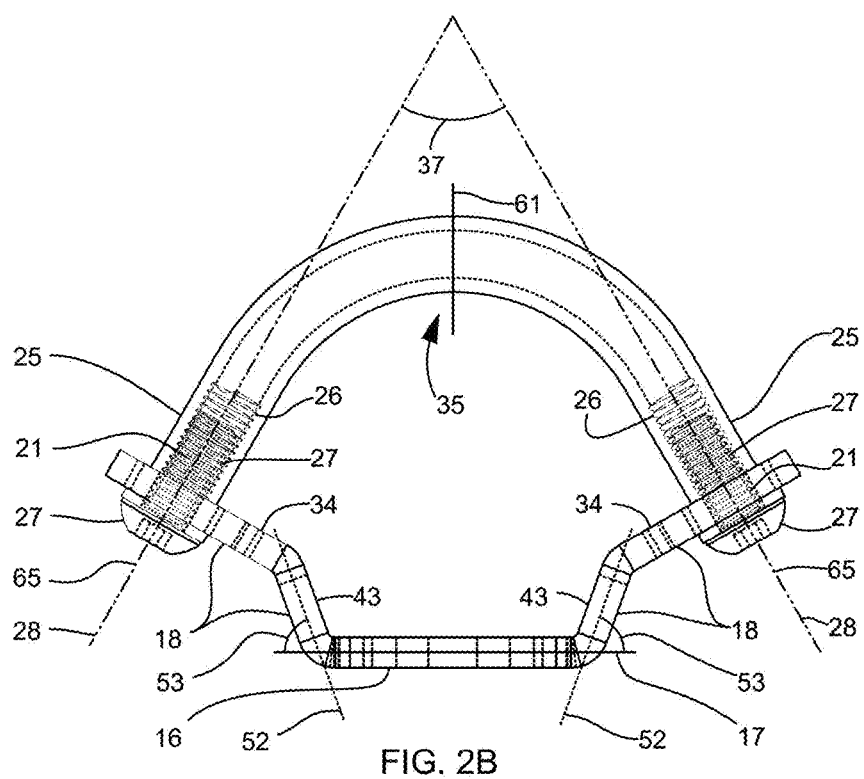
FIG. 2B shows FIG. 2A in transparent manner.
Figure 3:
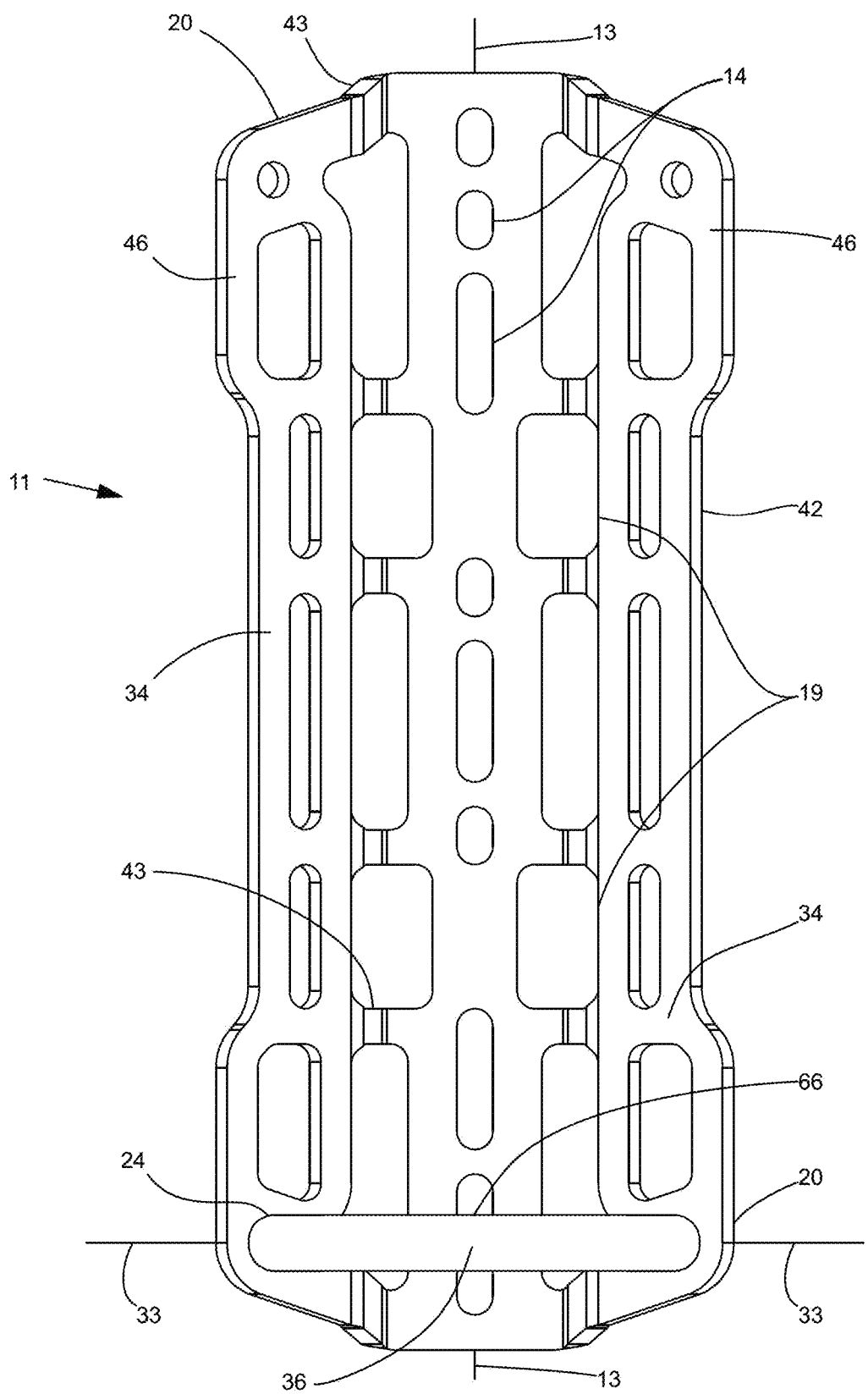
FIG. 3 shows a top view of the apparatus of FIG. 1A.

In particular embodiments, the cargo cradle 12 may feature two cradle wings 42 established opposite each other, each forming at least a part of a different outer, longitudinal cradle portion 18. A lower cargo fastener hole 21 may be in each wing 42 (at a longitudinal end thereof). The cradle wings 42 may have cradle wing surfaces that define a respective cradle wing plane 44; each such plane may form a respective acute cradle wing plane angle 45 with the spine plane 17. Each wing 42 may be fastened to the cradle spine 16 with connection structure 43 (e.g., ribs) that may form part of the outer, longitudinal cradle portions 18 (again, the portions of the cradle on each side of the cradle spine 16). Such connection structure 43 may each lie in or define a respective wing connection structure plane 52; each such plane may form a respective acute wing connection structure plane angle 53 with the spine plane 17. In particular embodiments, each acute wing connection structure plane angle 53 may be larger than each acute cradle wing plane angle 45. FIGS. 2A and 2B may show such angles, as may exist in certain of the many possible embodiments of the inventive technology.

Particularly in embodiments with a cargo cradle 12 exhibiting a gull wing shape in cross-section (and even more so, in those embodiments with a gull shape with upturned wings, as shown in, e.g., FIGS. 2A and 2B), the wings 42 may more directly contact cargo placed in and fastened to the cargo cradle 12 than may another/other component(s) of the cargo cradle 12 (e.g., connection structure 43). Note that, as explained elsewhere in this description, an element need not be uniform or flat in order to lie in or define a plane. Nonetheless, in particular embodiments, the cradle wings 42 may each have a respective cargo facing cradle wing surface 46 that is at least partially flat. The cradle wings 42 may be of the same material (e.g., flat plate metal as but one example) as the remaining component(s) of the cargo cradle 12.

Fasteners 27 such as headed, threaded fasteners (as shown in the figures) may be configured (e.g., sized) to pass through the two cargo support fastener holes 21 and may be threaded into the straight, internally threaded holes 26 at the end portions of the cargo support 24, to enable (by playing a role in) removable, secure fastening of the cargo support 24 to the cargo cradle 12. Washer(s) may be used on either or both sides of the cradle at the cargo support fastener holes. In particular embodiments, centerlines 28 of the straight, internally threaded holes, i.e., threaded hole centerlines 28, centerlines 65 of each of the headed, threaded fasteners when the cargo support 24 is fastened to the cargo cradle 12 and/or centerlines 29 of the cargo support end portions 25, may lie in an installed cargo support fastener plane 33 that is perpendicular to the cradle longitudinal axis 13. Such may result in the fasteners 27 such as headed, threaded fasteners or other fastener exerting cargo support-to-cargo cradle fastening forces whose directional centerlines 32 are in that same plane (which, again, is perpendicular to the cradle longitudinal axis), which may offer advantages relative to, e.g., facilitation of removal of the cargo support 24 from the cargo cradle 12 while the apparatus 11 remains mounted on the cycle component, in addition to possible strength benefits. In particular embodiments, centerlines 28 of the straight, internally threaded holes, i.e., threaded hole centerlines 28, centerlines 65 of each of the headed, threaded fasteners when the cargo support 24 is fastened to the cargo cradle 12 and/or centerlines 29 of the cargo support end portions 25 may intersect the spine plane 17 at opposing, acute fastener angles 50, which may offer advantages relative to, e.g., ease of removal of the cargo support 24 while the apparatus 11 is mounted on a bicycle component.

Figure 5:
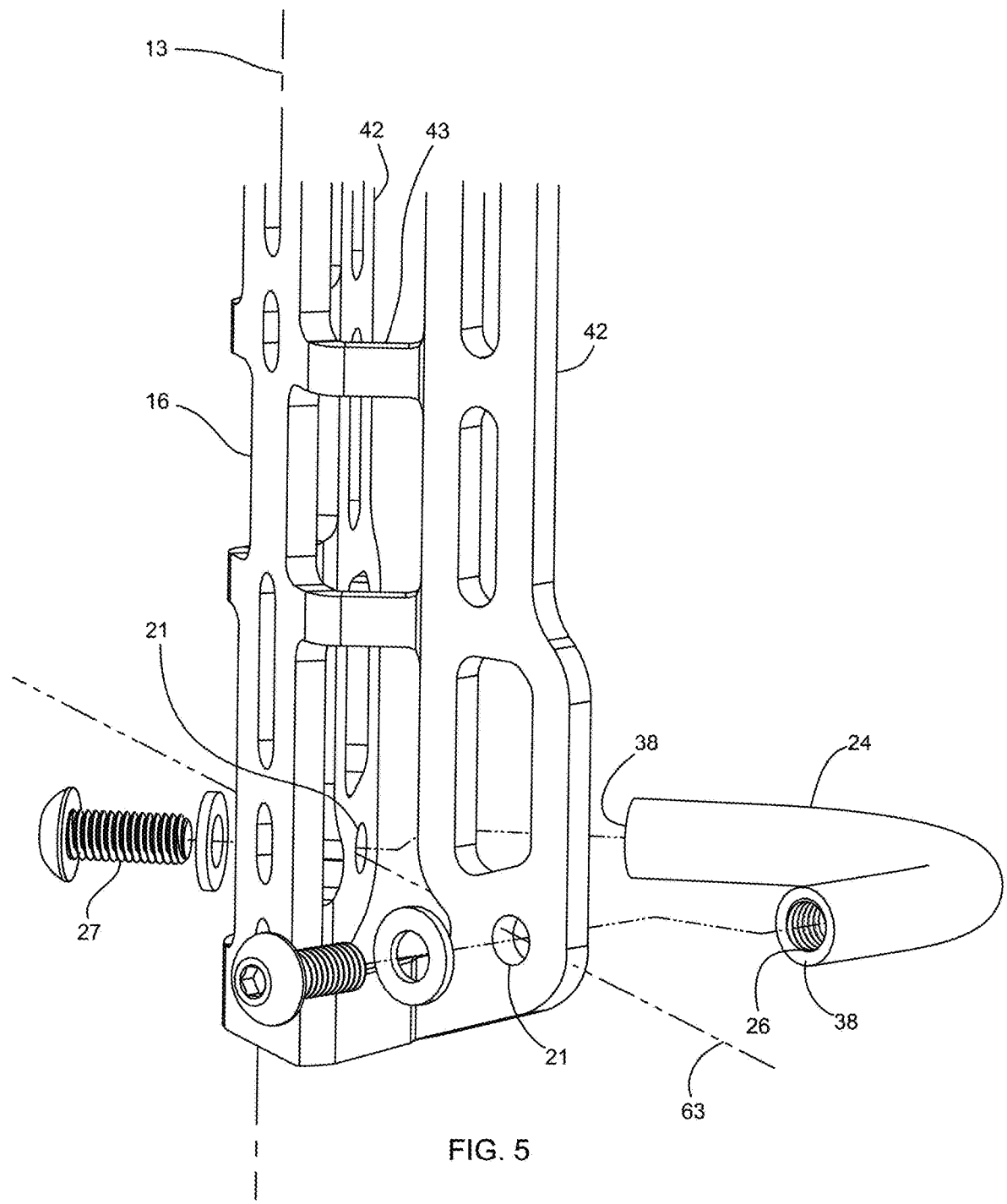
FIG. 5 shows a left side, perspective, exploded view of a lower portion of an embodiment of the inventive apparatus.

It is of note that the cargo support-to-cargo cradle fastening forces 32 may be achieved in a manner that is different from that manner shown in the figures, but that is still within the ambit of the inventive technology. Indeed, while the apparatus of the figures shows the use of discrete bolts (a headed, threaded fastener) as shown in their entirety in FIG. 5, that pass through the cargo support fastener holes 21 and thread into straight, internally threaded holes 26 established in the end portions 25 of the cargo support 24 to achieve the fastening forces, in a different embodiment, different fasteners, such as threaded shafts without heads, may extend from the cargo support end portions 25 (specifically from termina 38 thereof), and pass through the cargo support fastener holes 21, onto each of which (on the "lower" side of such holes), a nut (internally threaded nut) may be thread and tightened to achieve the cargo support-to-cargo cradle fastening forces. In each design, a fastener is considered as passing through each of the cargo support fastener holes 21 to enable removable, secure fastening of the cargo support to the cargo cradle (perhaps upon use of an additional component such as the internally threaded holes in the cargo cradle end portions in the case of discrete bolt type fastening as shown in the figures, or a nut in the case of threaded shafts extending rigidly from the cargo support end portions (more specifically, from termina thereof)).

Figures 1A, 1B:
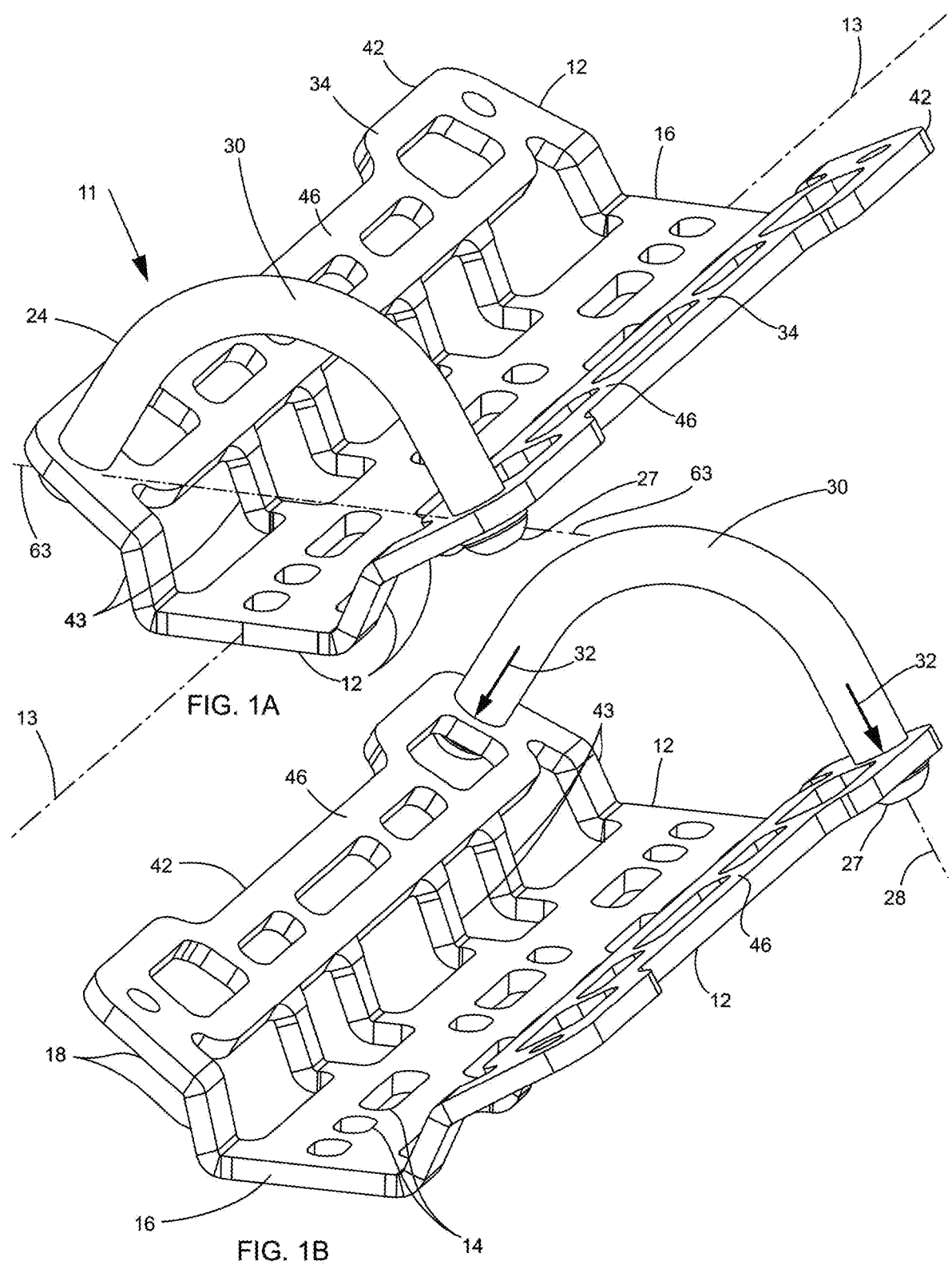
FIG. 1A shows a perspective view of the apparatus (with its cradle placed flat on a horizontal surface (not shown), in un-mounted condition, without cargo), from above, left front (where right and left refer to a particular side of the cradle longitudinal axis, when the apparatus is viewed with the cargo support at the bottom and towards the viewer), as may appear in one of the many embodiments of the inventive technology.
FIG. 1B shows a perspective view of the apparatus of FIG. 1A, from above, right rear.

In particular embodiments, the cargo support end portions 25 may each terminate at a respective terminus 38 in a respective plane 51 that is normal to the centerline 28 of the respective straight, internally threaded hole 26 (such respective planes are different, but may possibly intersect at an obtuse angle). Such may enable each of the headed, threaded fasteners 27 to compressively fasten a different one of the cargo support end portions 25 flush against a different one of the cargo facing wing surfaces 46 when the cargo support 24 is fastened to the cargo cradle 12 (which is considered as occurring even where a washer is used, where the washer can be reasonably viewed as a localized extension of the cargo facing wing surface), creating a snug, secure fastening with no "play" in the cargo support 24 relative to the cargo cradle 12. What may also play a role in such snug fastening is a bend 35 in the cargo support 24 (e.g., in its central portion 36, perhaps between end portions 25 that are straight) at a certain bend angle 37 and along a certain length of the cargo support 24 so that termina 38 of the cargo support end portions 25 present in flush manner against cargo facing, flat cradle surfaces 34 (e.g., where cargo facing wing surfaces 46 that are flat in shown in, e.g., FIG. 1A). Indeed, coordinating cargo support bend angle, cargo support bend length, and/or total cargo support length (along its centerline) may be required to present termina 38 of the cargo support end portions 25 in flush manner against cargo facing, flat cradle surfaces 34.

The inventive technology, as shown in the drawings, in particular embodiments, may feature an internally threaded tube (e.g., internally threaded at end portions 25) as a cargo support, to facilitate the creation of strong cargo support anchors (often formed, at least in part, with removable fasteners in an internally threaded hole) resulting in a strong, yet removable cargo support 24. In addition to benefits/advantages as described elsewhere in this description, the following are benefits/advantages that may be achieved by certain embodiments: allowance of use of lightweight aluminum for cargo cradle 12 and cargo support 24, and limiting use of heavier steel to the headed, threaded fasteners 27 that fasten the cargo support 24 to the cargo cradle 12; improved material strength/weight (stainless steel fasteners may be used only where it is most needed, in the highest stress area, where the cargo support's moment/torque is the greatest); thus, such design(s) uses heavy stainless steel only where it is needed most while the rest of the cage is made out of relatively weaker and much lighter aluminum); ease of manufacture (threading both ends of a straight tube for use as a cargo support, as may take place in manufacturing certain embodiments of the inventive technology, is a simple process for a CNC lathe machine (such tube can be bent/curved to the degree needed, achieving the bend angle needed (as defined by a central curve in the cargo support 24) for the termina 38 of the cargo support end portions 25 to define planes that are parallel to the cradle "wings" surface); and improved strength/weight (improved strength to weight due to geometric design factors, e.g., where a tube is superior to that of solid bar of the same diameter due to elimination of material from areas closer to the bar's neutral axis). At fastening sites, termina 38 of cargo support end portions 25 may be normal to cradle surface that it interfaces; internally threaded holes 26 may be inline with the axis of the cargo support 24; and/or axes of fasteners may be in-line with the cargo support where fasteners interact with the cargo support (or at the portion of support where fasteners are through it).

Note that the terms element and componentry, where used in this disclosure, including its written description and figures, should be understood as referring to one component or structure, or more than one components or structures, whether physically connected or not. Further, this disclosure, where describing feature(s) of the invention in apparatus-oriented terminology, should be understood as also impliedly and inherently disclosing method or process steps relating to function(s) performed by such feature(s) either alone or in combination with other disclosed features, where such function(s) would be apparent to a person having ordinary skill in the art after reviewing this disclosure. Further, one specific componentry (or, e.g., element) can perform not just one, but also, in certain embodiments, two or more different functions or steps, and two or more different steps can even be performed simultaneously. With respect to any use of the term configured, it should be understood to imply, e.g., the connection, assembly, installation, orientation, set-up, establishment, etc., that achieves the indicated function or result.

Relatedly, explicit disclosure of a noun should be understood as implicit disclosure of the verb performed by that noun, and vice versa (for example, explicit disclosure of a "fastener" effectively discloses, implicitly, "fastening"; explicit disclosure of "fastening" effectively discloses, implicitly, a "fastener.") The figures in particular should be understood as impliedly and inherently disclosing relative positioning of features/componentry shown, where such relative positioning would be apparent to a person having ordinary skill in the art. Further, technical aspects of the invention that would be known to a person having ordinary skill in the art, having reviewed this disclosure, may not be described in explicit detail in the application as filed to avoid a tedious or prolix writeup. Accordingly, this disclosure should be understood as including such aspects, even where not explicitly disclosed.

This disclosure should be understood as providing a broad supporting description that supports even claims not explicitly appearing in the application as filed. For example, this application should be understood as providing support for the combination of any two or more features, components, parts, structures, or steps where such combination is not explicitly disclosed in the application as filed. Indeed, the application as filed is intended to provide support for any permutations and combinations of any two or more features, components, parts, structures, or steps explicitly disclosed therein. Individual aspects disclosed in the application as filed should be potentially considered as independent inventions even where they are not explicitly indicated as such.

Even where only one specific embodiment is disclosed, whether in exemplary fashion or not, in explicit or unspecified support of a broad invention description or claim, such description or claim should not be limited in scope to such specific embodiment. The application as filed should also be understood as supporting products produced by explicitly disclosed processes or methods; and processes or methods that manufacture explicitly disclosed apparatus.

Any figures filed as part of this disclosure seek to show the invention or aspects thereof clearly and in uncluttered fashion. Accordingly, it is not necessarily the case that each of the figures of this disclosure shows every single component of the inventive technology or the aspect that it seeks to portray. It is also not necessarily the case that every single component shown on a figure is called out in that figure with a label given to that component in the written description.

With respect to claims using the term "comprise" or variant forms thereof, the use of "a" or "an" in connection with a limitation (e.g., "a support member"), is to be interpreted as "at least one" unless context or description in the application indicates otherwise.

What is claimed is:

1. A cycle-mountable cargo retention apparatus, comprising:
    a cargo cradle defining a cradle longitudinal axis and itself comprising:
        cargo cradle mounting holes that enable mounting of said apparatus to a cycle component;
        a central cradle spine through which said cradle longitudinal axis passes, said cargo cradle mounting holes established in said central cradle spine, and said central cradle spine defining a spine plane;
        outer, longitudinal cradle portions, each on a different side of said central cradle spine;
        strap guides that enable compressive, strap-type retention of cargo in and to said cargo cradle;
        two cargo cradle end portions; and
        cargo support fastener holes established on at least one of said cargo cradle end portions, on said outer, longitudinal cradle portions, and at respective cargo support fastener hole distances from said spine plane, wherein each of said respective cargo support fastener hole distances is non-zero;
    said apparatus further comprising:
    a cargo support that is removably fastenable to said cargo cradle, said cargo support comprising straight, cargo support end portions;
    straight, internally threaded holes, each of which is established in and along a length of a respective said straight, cargo support end portion; and
    fasteners configured to pass through said cargo support fastener holes and into said straight, internally threaded holes to enable removable, secure fastening of said cargo support to said cargo cradle,
    wherein said fasteners, when said cargo support is fastened to said cargo cradle, define fastener centerlines that lie in an installed cargo support fastener plane that is perpendicular to said cradle longitudinal axis.

2. The cycle-mountable cargo retention apparatus as described in claim 1 wherein, when said cargo support is fastened to said cargo cradle, said cargo support has a cargo support apex that is furthest from said spine plane and that is a cargo support apex distance from said spine plane, and wherein each of said respective cargo support fastener hole distances is at least 10% of said cargo support apex distance.

3. The cycle-mountable cargo retention apparatus as described in claim 1 wherein said cargo support comprises a lower cargo support, said cargo support fastener holes comprise lower cargo support fastener holes, said respective cargo support fastener hole distances comprise respective lower cargo support fastener hole distances, and said installed cargo support fastener plane comprises an installed lower cargo support fastener plane.

4. A cycle-mountable cargo retention apparatus, comprising:
a cargo cradle defining a cradle longitudinal axis and itself comprising:
cargo cradle mounting holes that enable mounting of said apparatus to a cycle component;
a central cradle spine through which said cradle longitudinal axis passes, said cargo cradle mounting holes established in said central cradle spine, and said central cradle spine defining a spine plane;
outer, longitudinal cradle portions, each on a different side of said central cradle spine;
strap guides that enable compressive, strap-type retention of cargo in and to said cargo cradle;
two cargo cradle end portions; and
two cargo support fastener holes established on at least one of said cargo cradle end portions, on said outer, longitudinal cradle portions, and at respective cargo support fastener hole distances from said spine plane, wherein each of said respective cargo support fastener hole distances is non-zero;
wherein said cargo cradle has a concave shape in a cross-section that is perpendicular to said cradle longitudinal axis;
said apparatus further comprising:
a cargo support comprising cargo support end portions; and
fasteners configured to pass through said two cargo support fastener holes to enable removable, secure fastening of said cargo support to said cargo cradle,
wherein said fasteners, when said cargo support is fastened to said cargo cradle, define fastener centerlines that lie in an installed cargo support fastener plane that is perpendicular to said cradle longitudinal axis.

5. The cycle-mountable cargo retention apparatus as described in claim 4 further comprising a straight, internally threaded hole established in, and along a length of each said cargo support end portion.

6. The cycle-mountable cargo retention apparatus as described in claim 5 wherein said two cargo support end portions comprise two straight, cargo support end portions.

7. The cycle-mountable cargo retention apparatus as described in claim 5 wherein said fasteners comprise headed, threaded fasteners configured to pass through said two cargo support fastener holes and into said straight, internally threaded holes.

8. The cycle-mountable cargo retention apparatus as described in claim 4 wherein said fasteners comprise threaded shafts extending from said cargo support end portions.

9. The cycle-mountable cargo retention apparatus as described in claim 4 wherein, when said cargo support is fastened to said cargo cradle, said cargo support has a cargo support apex that is furthest from said spine plane and that is a cargo support apex distance from said spine plane, and wherein each of said respective cargo support fastener hole distances is at least 10% of said cargo support apex distance.

10. The cycle-mountable cargo retention apparatus as described in claim 4 wherein said cargo cradle includes cargo facing, flat cradle surfaces, and wherein said cargo support comprises a cargo support bend in a central portion thereof to define a bend angle, so that termina of said cargo support end portions present flush against said cargo facing, flat cradle surfaces.

11. The cycle-mountable cargo retention apparatus as described in claim 4 wherein said cargo support has a cross-sectional shape selected from the group consisting of: circular, oval, square, at least partially curved, pentagonal, hexagonal and octagonal.

12. The cycle-mountable cargo retention apparatus as described in claim 4 wherein said cargo support end portions comprise straight, cargo support end portions.

13. The cycle-mountable cargo retention apparatus as described in claim 12 wherein said cargo support is curved between said straight, cargo support end portions.

14. The cycle-mountable cargo retention apparatus as described in claim 4 wherein said outer, longitudinal cradle portions comprises two cradle wings established opposite each other.

15. The cycle-mountable cargo retention apparatus as described in claim 14 wherein said cradle wings are connected to said central cradle spine with connection structure that forms a part of said outer, longitudinal cradle portions.

16. The cycle-mountable cargo retention apparatus as described in claim 14 wherein each of said cradle wings has a respective cargo facing cradle wing surface that defines a respective cradle wing plane that forms a respective acute cradle wing plane angle with said spine plane.

17. The cycle-mountable cargo retention apparatus as described in claim 14 wherein said two cargo support fastener holes are on said two cradle wings.

18. The cycle-mountable cargo retention apparatus as described in claim 14 wherein said concave shape is a gull wing shape.

19. The cycle-mountable cargo retention apparatus as described in claim 4 wherein said cargo support comprises a lower cargo support, said two cargo support fastener holes comprise lower cargo support fastener holes, said respective cargo support fastener hole distances comprise respective lower cargo support fastener hole distances, and said installed cargo support fastener plane comprises an installed lower cargo support fastener plane.

20. The cycle-mountable cargo retention apparatus as described in claim 4 wherein said cargo support comprises a discrete cargo support.

* * * * *